United States Patent [19]
Smith

[11] Patent Number: 6,141,180
[45] Date of Patent: Oct. 31, 2000

[54] METHOD AND APPARATUS FOR A DIGITAL LINEAR TAPE LOCKOUT SYSTEM

[75] Inventor: Mark A. Smith, Holdrege, Nebr.

[73] Assignee: Hewlett-Packard, Palo Alto, Calif.

[21] Appl. No.: 09/174,272

[22] Filed: Oct. 16, 1998

[51] Int. Cl.[7] .................................................. G11B 15/675
[52] U.S. Cl. ........................................................ 360/96.5
[58] Field of Search ................................. 360/96.5, 96.6, 360/92

[56] References Cited

U.S. PATENT DOCUMENTS 5,053,902  10/1991  Kato ........................ 360/96.5

*Primary Examiner*—Robert S. Tupper
*Attorney, Agent, or Firm*—Cynthia S. Mitchell

[57] ABSTRACT

A system is provided for ensuring that a digital linear tape cartridge is inserted into a receiving device in the desired orientation with the tape door going into the receiving device last. The receiving device may be a sleeve with a pivoting lockout that rotates about a pin. The pivoting lockout will pivot freely out of the path of the digital linear tape cartridge only when the cartridge is inserted into the receiving device in the correct orientation with the tape door going into the receiving device last. The pivoting lockout will interfere with the digital linear tape cartridge if a user attempts to install the cartridge into the receiving device in any of the possible seven incorrect orientations.

4 Claims, 4 Drawing Sheets

METHOD AND APPARATUS FOR A DIGITAL LINEAR TAPE LOCKOUT SYSTEM

FIELD OF THE INVENTION

The present invention relates generally to the field of digital linear tape cartridges and more particularly to a means for insuring proper orientation of the digital linear tape cartridge when it is inserted into a device such as a tape magazine, a library, a picker or a mail slot.

BACKGROUND OF THE INVENTION

Typically, a digital linear tape cartridge is installed into a receiving device, such as a removable or fixed cartridge magazine, an automatic tape cartridge picker, library, autochanger, a mail slot, etc. with the tape door side of the cartridge facing into the receiving device, that is, the tape door side of the cartridge going into the receiving device first. An offset slot currently exists in the digital linear tape cartridge which permits a protruding tab device to pass through in order to insure the tape door side of the cartridge is entering the receiving device first.

However, there may be instances where it is desirable to install a digital linear tape cartridge into a receiving device with the tape door side of the cartridge facing out of the receiving device, that is, with the tape door side of the cartridge going into the receiving device last. Due to the nature of digital linear tape cartridges, this requires a new lockout scheme to insure that the tape carridge is inserted into the receiving device in the new desired orientation with the tape door going into the receiving device last (tape door facing outward). It is desirable to have a method for a lockout scheme for digital linear tape cartridges that would insure that a tape cartridge is inserted into a receiving device with the tape door side going into the receiving device last (tape door facing outward).

SUMMARY OF THE INVENTION

The above and other aspects of the present invention are accomplished in a system that provides a receiving sleeve with a pivoting lockout that rotates about a pin. The pivoting lockout will interfere with the cartridge body if the cartridge is inserted into the receiving sleeve in any of the seven possible incorrect orientations that the square digital linear tape cartridge could be inserted. The pivoting lockout will pivot freely out of the path of the digital linear tape cartridge only when the tape cartridge is inserted into the receiving sleeve in the correct orientation with the tape door side going into the receiving sleeve last.

BRIEF DESCRIPTION OF DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
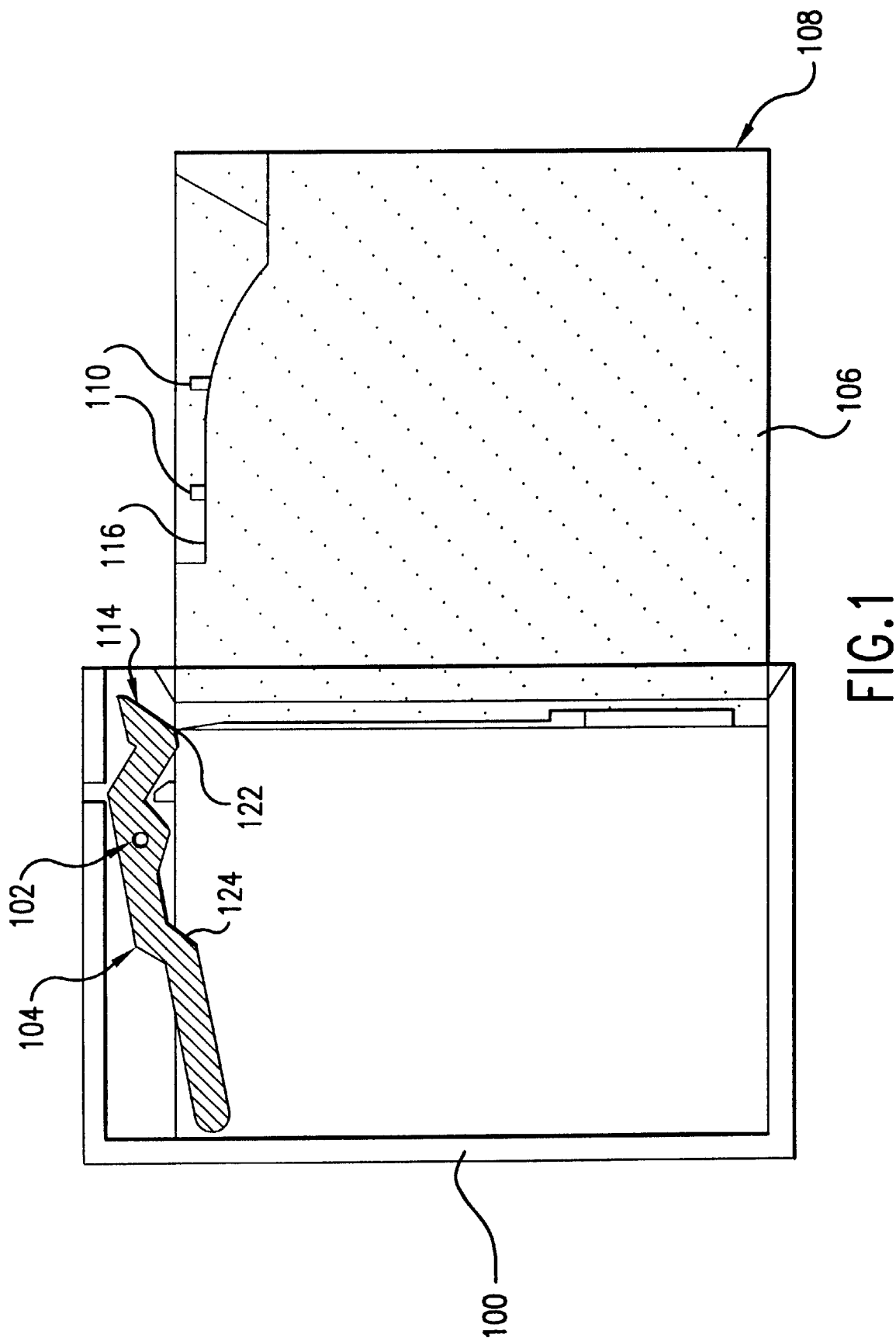
FIG. 1 shows a top view of a digital linear tape cartridge beginning to be inserted into a receiving sleeve with the tape door going into the receiving sleeve last according to the present invention.
Figure 2:
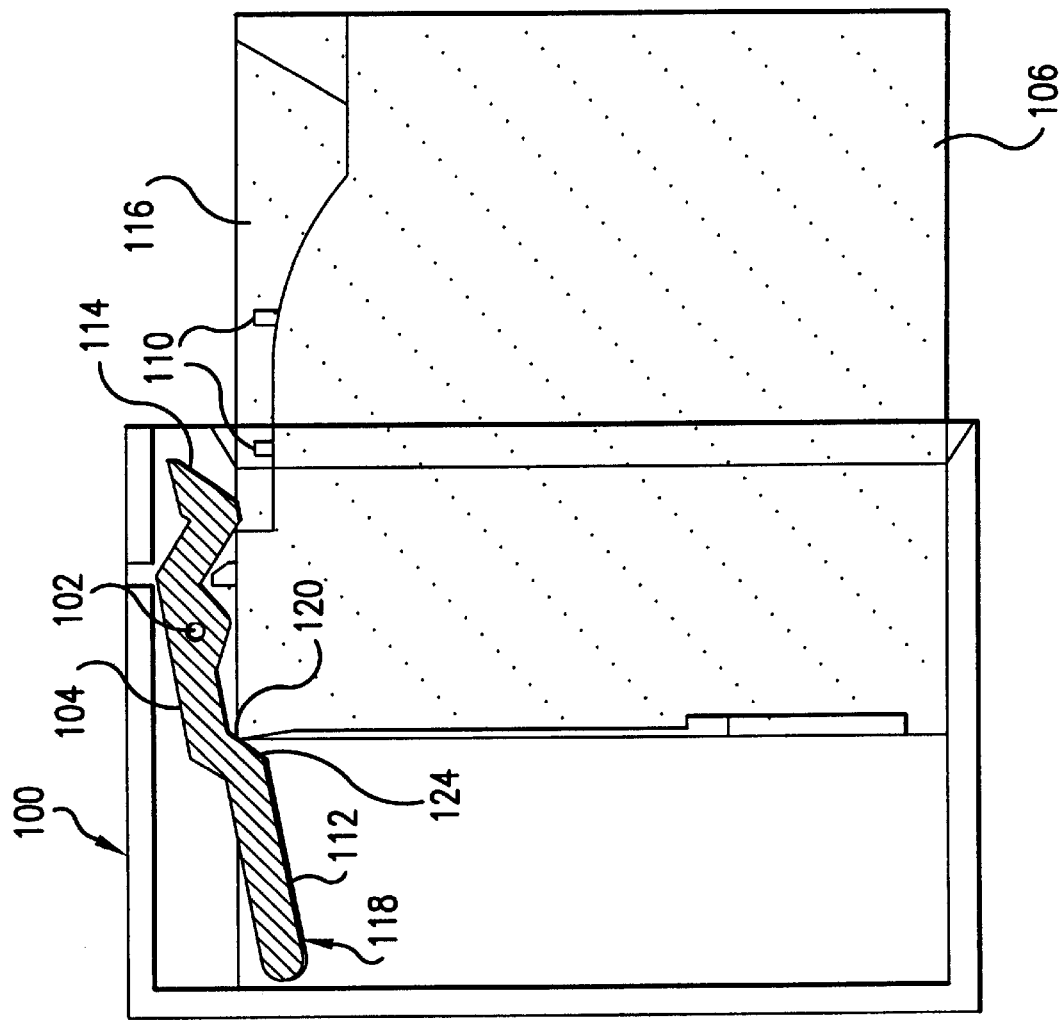
FIG. 2 shows a top view of a digital linear tape cartridge part of the way inserted into a receiving sleeve with the tape door going into the receiving sleeve last according to the present invention.
Figure 3:
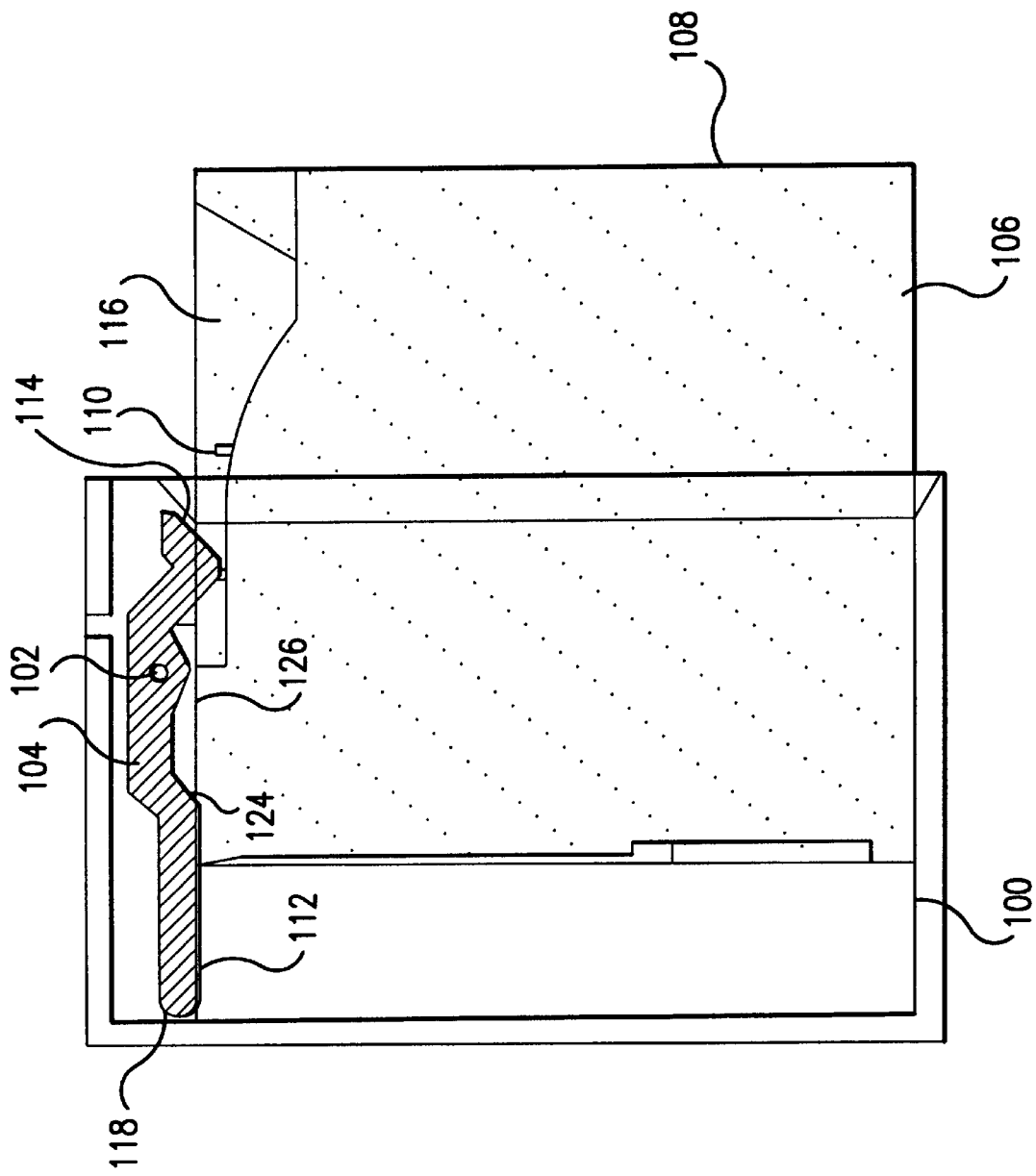
FIG. 3 shows a top view of a digital linear tape cartridge fully inserted into a receiving sleeve with the tape door going into the receiving sleeve last according to the present invention.

FIGS. 1–3 illustrate a digital linear tape (DLT) cartridge 106 being inserted into a sleeve 100 of a receiving device, such as a removable or fixed cartridge magazine, a library, an autochanger, a mail slot, etc. (not shown). As the DLT cartridge 106 enters the sleeve 100 of the receiving device with the tape door side 108 facing out of the sleeve 100, the corner 122 of the DLT cartridge 106 comes into contact with the slanted leading edge 114 of the pivoting lockout 104. As the DLT cartridge 106 is inserted into the sleeve 100 of the receiving device, the corner 122 slides along the slanted leading edge 114 of the pivoting lockout 104 and causes the pivoting lockout 104 to rotate in such a manner that the leading edge of the pivoting lockout 104 moves out of the path of the DLT cartridge 106 as it is slid into the sleeve 100. As the DLT cartridge 106 is slid further into the sleeve 100, the corner 122 of the DLT cartridge 106 comes into contact with the slanted leading edge 124 of the tail 118 of the pivoting lockout 104. This causes the pivoting lockout 104 to rotate in the opposite direction until the leading edge 114 of the pivoting lockout 104 comes to rest inside the cavity 116 of the DLT cartridge 106, and tail 118 rests along side 126 of the DLT cartridge 106. Pivoting lockout 104 rotates about a pin 102, but may also rotate about a rivet, screw or other known fastening means that permits rotational movement.

The sleeve 100 may be made of any of a wide range of materials, such as metals or plastics, including but not limited to steel or aluminum. In the interest of manufacturing and cost reduction, sleeve 100 is preferably made of a thermoplastic material, such as polycarbonate plastic with 10% by weight carbon and 10% Teflon to reduce friction and wear, although other moldable plastics may also be used. Pivoting lockout 104 may also be made of any of a wide range of materials, such as metals or plastics. Pivoting lockout 104 is preferably made of Nylon 6/10 plastic with 30% by weight carbon and 15% Teflon to reduce friction and wear with the DLT Cartridge 106, although other moldable plastics may also be used. Pin 102 may be made of any of a wide range of materials, such as metals or plastics. Pin 102 is preferably made of a commercially available standard steel dowel pin, although other materials may also be used. If either pivoting lockout 104 or sleeve 100 were injection molded plastic parts, then pin 102 could even be eliminated as a separate part by making it a molded feature on one of these two parts.

Figure 4:
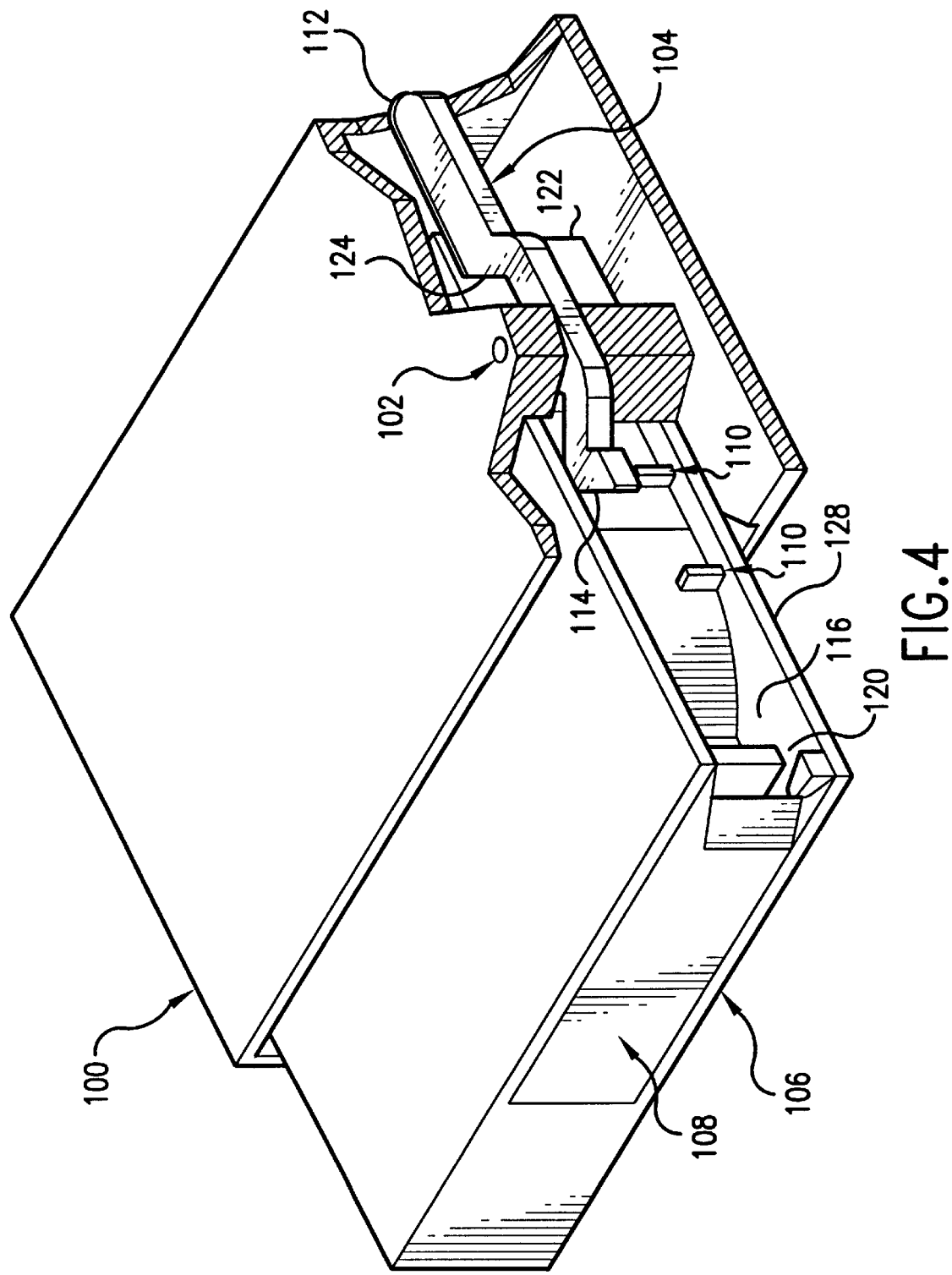
FIG. 4 shows a perspective view of a digital linear tape cartridge fully inserted into a receiving sleeve with the tape door going into the receiving sleeve last according to the present invention.

FIG. 4 illustrates a cutaway perspective view of the DLT cartridge 106 fully inserted into sleeve 100 with the leading edge 114 of the pivoting lockout 104 resting in cavity 116 of the DLT cartridge 106 and tail 118 of the pivoting lockout 104 resting along the side 126 of the DLT cartridge 106. Also, tape door 108 is facing out of the sleeve 100. A ledge 112 may be added to the bottom edge of tail 118. Thus, if an operator attempts to insert the DLT cartridge 106 with the tape door 108 facing inward, rim 112 will remain in contact with and slide along side wall 128 of the DLT cartridge 106, preventing the pivoting lockout 104 from rotating as the DLT cartridge 106 is inserted into the sleeve 100.

As can be seen in FIG. 4, the pivoting lockout 104 is offset in the sleeve 100 towards one side, such that the leading edge 114 of the lockout does not come into contact with ribs 110 in cavity 116 of the DLT cartridge 106. Also, if an operator attempts to insert the DLT cartridge 106 with the tape door 108 facing inward, the leading edge 114 of the pivoting lockout 104 will catch on ribs 110 in cavity 116. If the operator attempts to force the DLT cartridge 106 into the sleeve 100, the ribs 110 will create a rotational force on the pivoting lockout 104, but side wall 128 will be in contact with ledge 112 of the tail 118 and will thus prevent the pivoting lockout 104 from rotating. Accordingly, the DLT cartridge 106 will not be able to be fully inserted into the sleeve 100 with the tape door 108 facing into the sleeve 100.

It should also be noted that the present solution to locking out the insertion of a DLT cartridge so that the cartridge may only be inserted into a receiving device is entirely contained within the sleeve 100 of the receiving device. The DLT cartridge has not been changed. The present solution merely uses features already present on existing DLT cartridges. Therefore, if an operator wishes to insert the DLT cartridge with the tape door 108 facing into a receiving device other than a receiving device having a sleeve according to the present invention, the DLT cartridge will be capable of being inserted into the receiving device with the tape door 108 facing inward.

The foregoing description of the present invention has been presented for purposes of illustration and description. It is not intended to be exhaustive or to limit the invention to the precise form disclosed, and other modifications and variations may be possible in light of the above teachings. For example, the sleeve 100, the pin 102 and the pivoting lockout 104 may be made of any known hard material other than those materials disclosed. The embodiment was chosen and described in order to best explain tile principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital linear tape cartridge lockout system for ensuring that a digital linear tape cartridge having a cavity and a tape door is installed into a receiving device in a correct orientation with the tape door going into the receiving device last, the digital linear tape cartridge lockout system comprising:

a sleeve for receiving said digital linear tape cartridge;

a pivoting lockout mounted in said sleeve, wherein said pivoting lockout rotates out of the path of the digital linear tape cartridge only when the digital linear tape cartridge is inserted into the sleeve in the correct orientation with the tape door facing out of the sleeve;

wherein a leading edge of said pivoting lockout rotates out of the path of the digital linear tape cartridge only when the digital linear tape cartridge is inserted into the sleeve in the correct orientation with the tape door facing out of the sleeve;

wherein a tail of said pivoting lockout counter rotates the pivoting lockout as the digital linear tape cartridge reaches a fully inserted position; and wherein said leading edge of said pivoting lockout rests in said cavity of said digital linear tape cartridge when said digital linear tape cartridge is fully inserted into said sleeve.

2. The digital linear tape cartridge lockout system according to claim 1 wherein said pivoting lockout is mounted in said sleeve by means of a pin and pivots about the axis of said pin.

3. The digital linear tape cartridge lockout system according to claim 1 wherein said sleeve is made of plastic.

4. A method of permitting a digital linear tape cartridge having a cavity and a tape door to be inserted into a digital linear tape cartridge receiving device having a sleeve with a pivoting lockout in only one orientation with said tape door facing out of the sleeve, said method comprising:

inserting said digital linear tape cartridge into said sleeve with the tape door facing out of the sleeve;

a leading surface of said digital linear tape cartridge rotating a leading edge of said pivoting lockout out of the path of said digital linear tape cartridge;

pushing said digital linear tape cartridge into said sleeve;

said leading surface of said digital linear tape cartridge counter rotating a tail of said pivoting lockout as said digital linear tape cartridge moves into a fully inserted position within said sleeve; and said leading edge of said pivoting lockout nesting into said cavity in said digital linear tape cartridge as said digital linear tape cartridge moves into a fully inserted position withing said sleeve.

* * * * *

UNITED STATES PATENT AND TRADEMARK OFFICE
CERTIFICATE OF CORRECTION

PATENT NO.    : 6,141,180
DATED         : October 31, 2000
INVENTOR(S)   : Mark A. Smith It is certified that error appears in the above-identified patent and that said Letters Patent is hereby corrected as shown below:

<u>Column 4,</u>
Line 45, delete "withing" and insert therefor -- within --

Signed and Sealed this

Twenty-third Day of July, 2002

*Attest:*

*Attesting Officer*

JAMES E. ROGAN
*Director of the United States Patent and Trademark Office*